Sept. 28, 1965 W. D. VOELKER 3,208,103
GAS CHAMBER FOR APPLYING PRESSURE TO CONTINUOUS
STRIPS OF PLASTIC
Filed Nov. 30, 1962
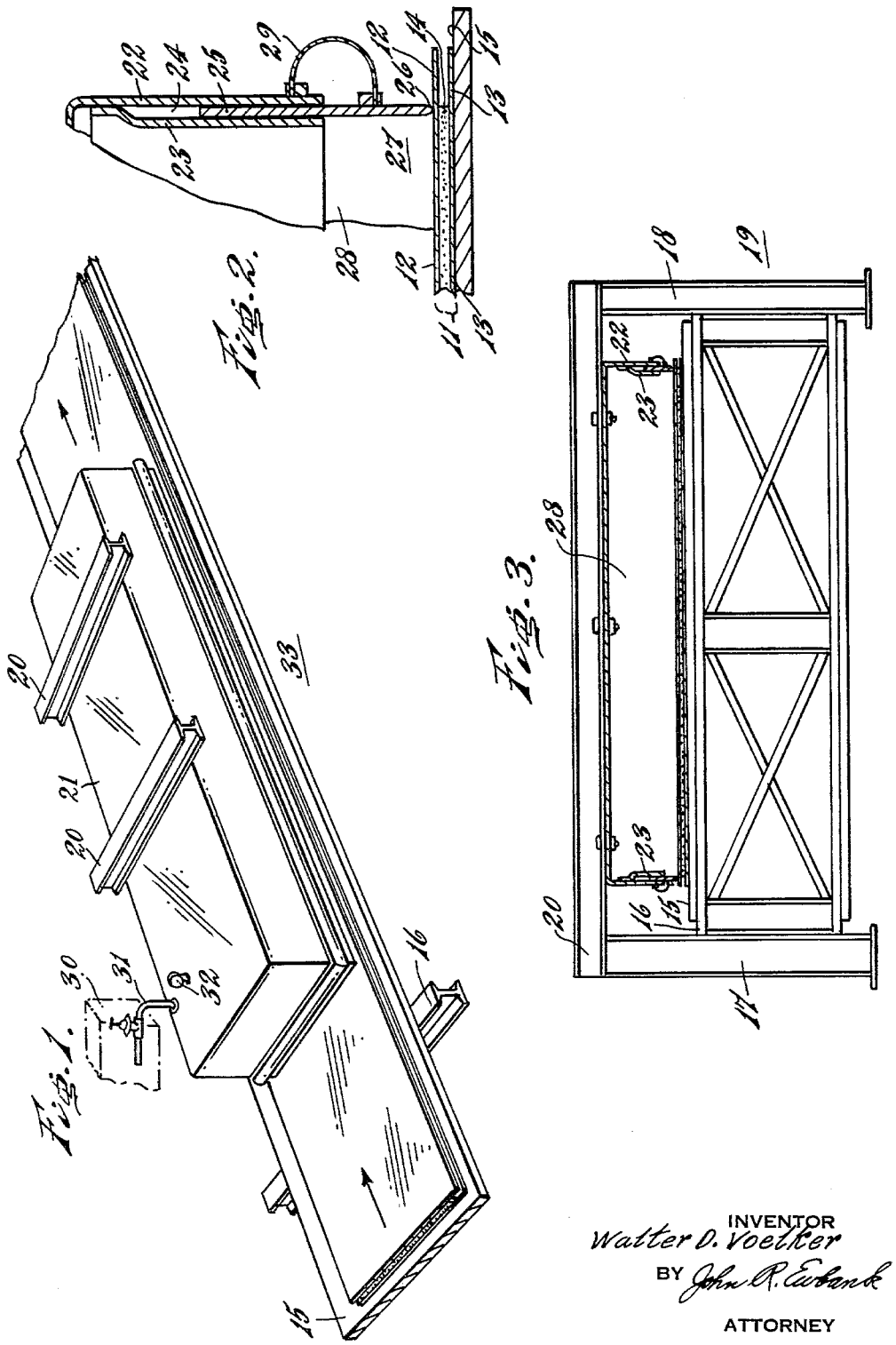
INVENTOR
Walter D. Voelker
BY John R. Eubank
ATTORNEY

United States Patent Office 3,208,103
Patented Sept. 28, 1965

3,208,103
GAS CHAMBER FOR APPLYING PRESSURE TO CONTINUOUS STRIPS OF PLASTIC
Walter D. Voelker, Philadelphia, Pa., assignor to Union Carbide Corporation, New York, N.Y., a corporation of New York
Filed Nov. 30, 1962, Ser. No. 241,257
2 Claims. (Cl. 18—6)

This invention relates to apparatus for the manufacture of strips of sandwich structures having cores of polyurethane foams, in which the strip advances along a base, and is particularly concerned with devices for applying adjustable amounts of yielding pressure.

Heretofore there have been proposals for adjustable rollers urged by yielding springs against the advancing strip, but certain difficulties have been encountered in connection with such devices. The strip is pulled through a series of zones, and can be torn if the frictional force becomes excessive at a zone of compression of the sandwich. Adverse variations in the thickness have heretofore promoted extreme differences in the friction at a compression zone leading to excessively frequent tearing of the strip being pulled through the polyurethane sandwich production line.

In accordance with the present invention, a stream of gas under controled pressure flows to and through an expandable-contractable plenum chamber to control the yielding pressure applied to a sandwich advancing beneath the plenum chamber. The gas pressure is maintained within the relatively narrow range of from about one half to about two atmospheres, whereby the maximum pressure applied is maintained at a low enough value that damage to the strip of foam and/or precursor for foam is avoided.

The nature of the invention is further clarified by reference to the accompanying drawings, in which FIG. 1 is a perspective view of an embodiment of the invention. FIG. 2 is a partial sectional view of a leakproof telescopic sleeve of the device of FIG. 1. FIG. 3 is a partially sectional view of the device of FIG. 1.

Referring now in detail to the drawings, an advancing strip of precursor 11 comprises an upper facing sheet 12 and lower facing sheet 13, and a core 14 transformable into polyurethane foam. The precursor 11 advances along a base 15, whereby the core 14 undergoes a series of transformations, becoming thicker and stronger as the sandwich approaches a withdrawal zone. As best shown in FIG. 3, the base 15 may be supported by beams 16 secured to columns 17, 18 of a frame 19. From topbeams 20 of the frame 19 an upper gas box 21 is suspended so that sidewalls 22 of the gas box 21 extend downwardly toward the base 15. Guide members 23 cooperate with sidewalls 22 in providing slots 24 accommodating sidewalls 25 of a lower sleeve 27 telescopically interfitted with gas box 21. The combination of gas box 21 sidewalls 22, guides 23 sidewalls 25 of the sleeve 27, and advancing face 12 function together to provide an expandable-contractable plenum chamber 28. A rectangular contact line 26 between the bottom edges of the sidewalls 25 and the facing sheet 12 slideably advancing underneath the sleeve 27 permits a limited amount of leakage of gas between the plenum 28 and atmosphere. A flexible membrane 29 made of a gas-impervious flexible material such as rubber, connects sidewall 22 of gas box 21 and sidewalls 25 of sleeve 27, thereby decreasing likelihood of gas leakage from the plenum 28 except at contact line 26. Particular attention is directed to a pressure control system 30 which maintains the gas pressure in the plenum 28 at a desired level within the range from one half to two atmospheres. A conduit 31 connects the pressure control system 30 and plenum 28. The pressure in the plenum can be noted by reading a gauge 32.

In the operation of the production line, the sandwich 11 advances into a pressure zone 33 between the base 15 and the sleeve 27. The core 14 between the upper and lower facing sheets 12 and 13 is quite responsive to changes in pressure, and may be transformed into a relatively worthless material by excessive pressure under adverse conditions. However, the application of the precisely correct amount of pressure can promote the transformation of the core into a significantly more useful component of the sandwich structure. Accordingly, it is highly important that the pressure be applied exactly as required for the core at the particular stage of development.

The pressure with which the upper face 12 is pushed against the core 14 in a pressure zone 33 is dependent to a significant degree upon the gas pressure in the plenum chamber 28. Thus, by the adjustment of the pressure control system 30, the pressure exerted against the advancing precursor can be precisely regulated. Under some conditions, it is desirable to employ a pressure of only a few grams per square centimeter and only very rarely should the pressure be of the magnitude of an atmosphere or about a kilogram per square centimeter. Pressures of the magnitude of a few hundred grams per square centimeter are more frequently desired. In the event of an adverse increase in thickness of the sandwich, the thick portion of the strip may advance through the pressure zone 33 without greatly increasing the frictional resistance for pulling the strip. Moreover, the effective pressure on the core 14 is substantially controlled by the pressure of the gas (usually air) supplied through conduit 31, and is almost unaffected by the level of the sleeve 27 above the base 15. The same production line is generally employed for making on different days different types of polyurethane foam sandwich strips, and the essentially self-adjusting feature of the sleeve 27 for producing strips of various thicknesses is a significant advantage. By reason of the large volume of the plenum chamber 28 and the maintenance of a precise pressure therein through the operation of the pressure control system 30, the pressure exerted by the pneumatic pressure plate does not vary significantly with the level and variations of level of the sleeve 27, but is dependent almost entirely upon the gas pressure of the pressure control system 30. If the plenum chamber 28 is under vacuum (which is rarely desirable) atmospheric air leaks in at contact line 26. If the plenum is maintained under pressure, air leaks out at contact line 26. The flexible membrane 29 acts as a leakproof skirt to minimize gas leakage through the telescopic fit between the sleeve and sidewalls.

In a modification of the invention, the height at which the cross beam 20 is positioned above the base 15 may be adjusted so that the normal height of the sleeve 27 can be positioned at the most appropriate level.

Various modifications of the invention are possible without departing from the scope of the appended claims.

The invention claimed is:

1. Apparatus for the manufacture of sandwich structures having a core of polyurethane foam and an upper and a lower facing sheet, said apparatus comprising in combination: a base along which a sandwich structure advances with a lower facing sheet in sliding contact therewith; an upper gas box positioned above the base, said gas box having vertical sidewalls; a sleeve vertically slideable against the sidewalls of said gas box, the bottom of the sleeve being in sliding contact with the advancing upper facing sheet of the sandwich structure; means directing a stream of gas to the plenum chamber defined by the gas box sleeve, and advancing sandwich structure to maintain in such plenum chamber a gauge pressure less than one atmosphere; and a flexible skirt member interconnecting said sleeve and the sidewalls of said gas box to decrease the leakage of gas through the sliding fit between said sleeve and said sidewalls.

2. In apparatus for the manufacture of sandwich structures having a core of polyurethane form, which apparatus includes a base along which a strip of sandwich structure advances, the improvement of a plenum chamber for applying a controlled pressure on an upper face of the advancing sandwich structure, said plenum chamber comprising a vertically slideable sleeve having a bottom edge slideably contacting said upper face of the advancing sandwich structure, and an upper portion fitting against sidewalls of a gas box for relative vertical slideable movement with respect thereto; a gas box mounted above said sleeve, said gas box having sidewalls fitting against the upper portion of said vertically slideable sleeve; a flexible skirt member interconnecting said sleeve and the sidewalls of said gas box to decrease gas leakage through the sliding fit between the sleeve and the sidewalls; and a gas pressure control system adapted to regulate gas pressure within a range of from about one-half to about two atmospheres in an enclosed zone defined by said plenum chamber subtended by the upper face of said advancing sandwich structure.

References Cited by the Examiner
UNITED STATES PATENTS

| | | | |
|---|---|---|---|
| 1,885,121 | 11/32 | Loweke | 74—18.2 |
| 2,135,763 | 11/38 | Nicholson. | |
| 2,135,763 | 11/38 | Nicholson. | |

WILLIAM J. STEPHENSON, *Primary Examiner.*

MICHAEL V. BRINDISI, *Examiner.*